Feb. 5, 1957   E. A. JARECKIE   2,780,196
HOIST BOOM TOWING CONNECTION
Filed April 23, 1954   6 Sheets-Sheet 1

FIG. 1

WATER LINE

INVENTOR.
EUGENE A. JARECKIE
BY
*Philip S. Hogan.*
ATTORNEY

Feb. 5, 1957 E. A. JARECKIE 2,780,196
HOIST BOOM TOWING CONNECTION
Filed April 23, 1954 6 Sheets—Sheet 2

FIG. 2

WATER LINE

INVENTOR.
EUGENE A. JARECKIE
BY
ATTORNEY

Feb. 5, 1957  E. A. JARECKIE  2,780,196
HOIST BOOM TOWING CONNECTION
Filed April 23, 1954  6 Sheets-Sheet 3

WATER LINE

INVENTOR.
EUGENE A. JARECKIE
BY
ATTORNEY

Feb. 5, 1957    E. A. JARECKIE    2,780,196
HOIST BOOM TOWING CONNECTION
Filed April 23, 1954    6 Sheets-Sheet 5

INVENTOR.
EUGENE A. JARECKIE
BY
ATTORNEY

United States Patent Office 2,780,196
Patented Feb. 5, 1957

2,780,196
HOIST BOOM TOWING CONNECTION

Eugene A. Jareckie, Madison, N. J., assignor to McKiernan-Terry Corporation, Harrison, N. J., a corporation of New Jersey Application April 23, 1954, Serial No. 425,113

21 Claims. (Cl. 114—.5)

The invention disclosed in this patent application is a hoist for lowering and towing objects or equipment over the side of a ship.

Particularly the invention is concerned with the towing overside of Sonar or other radio equipment requiring accurate directive training and depth adjustment.

Objects of the invention are to provide hoist construction operable to lower what may be broadly considered a vehicle, tow it off the side of the ship at selected depth while maintaining it in line with the ship travel, and operable further to raise and safely and securely stow the vehicle aboard ship.

Important objects of the invention are to provide such apparatus in a practical form, readily applicable as a unit structure to existing ship designs.

These objects are accomplished by a novel combination of upper and lower hoist booms pivoting on fixed centers at their inboard ends and pivotally connected at their outboard ends by a spacer head carrying a guide in the nature of a hollow cone for centering the towed vehicle, possibly or usually in the form of a ball or sphere, with a single hoist line such as articulated linkage which will hold the towed vehicle in line with the ship travel and which when hauled in will first nest the sphere in the cone and then raise the booms and stow these movable parts fully inboard, and in reverse action will swing the booms outward and lower the vehicle after reaching fully outswung position.

The invention further comprises spring means for cushioning the inboard stowing movement and for iniating outward swinging movement of the booms, automatic means for centering and leading the articulated linkage in a straight line to the hoisting drum and special locks for securing the booms in the outboard towing position and for locking the vehicle as it is lifted into the more or less conical guide.

Further novel features of the invention and other desirable objects attained by the invention are set forth or will appear in the course of the following specification.

The drawings accompanying and forming part of the specification illustrate a present practical embodiment of the invention. Structure, arrangement and combination of elements may, however, be modified and changed as regards this illustration, all within the true intent and broad scope of the invention as hereinafter defined and claimed.

Figure 1:
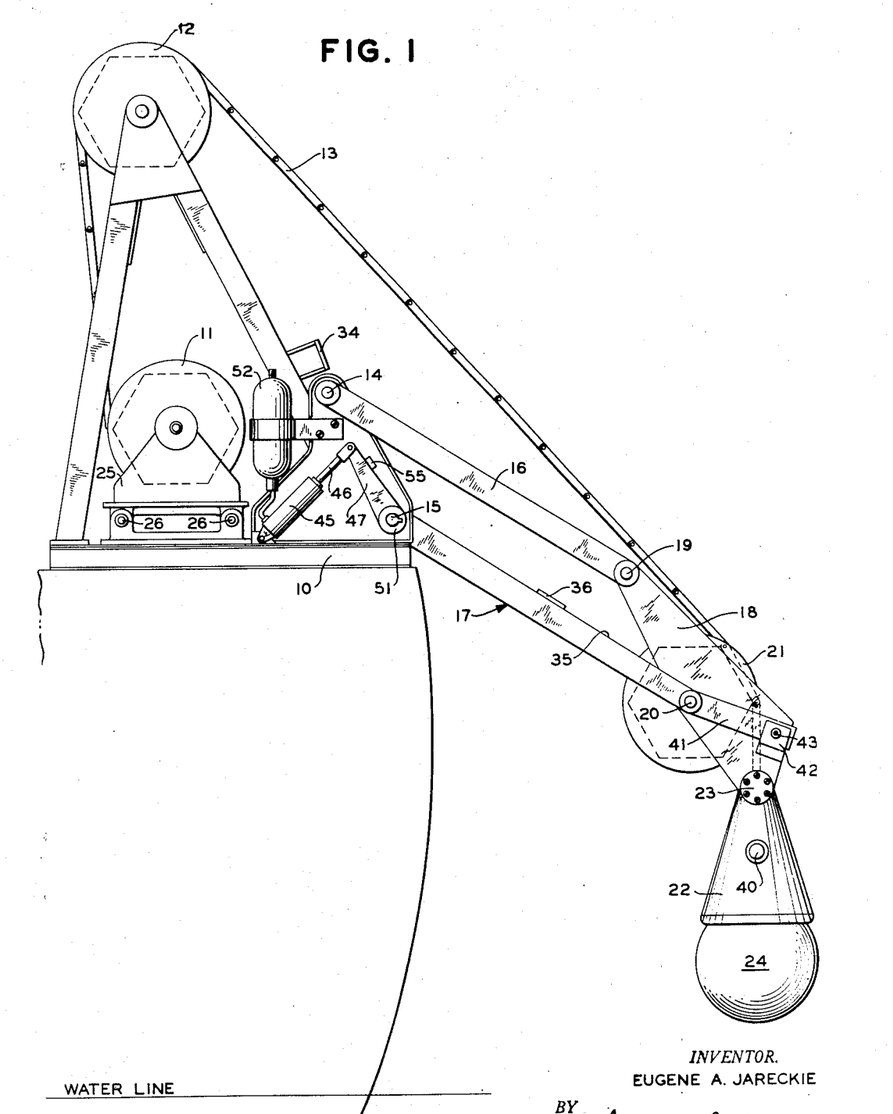
Fig. 1 in the drawings is a side elevation of one of the hoists mounted on shipboard and showing the booms constituting a supporting parallelogram swung outward in towing position.
Figure 2:
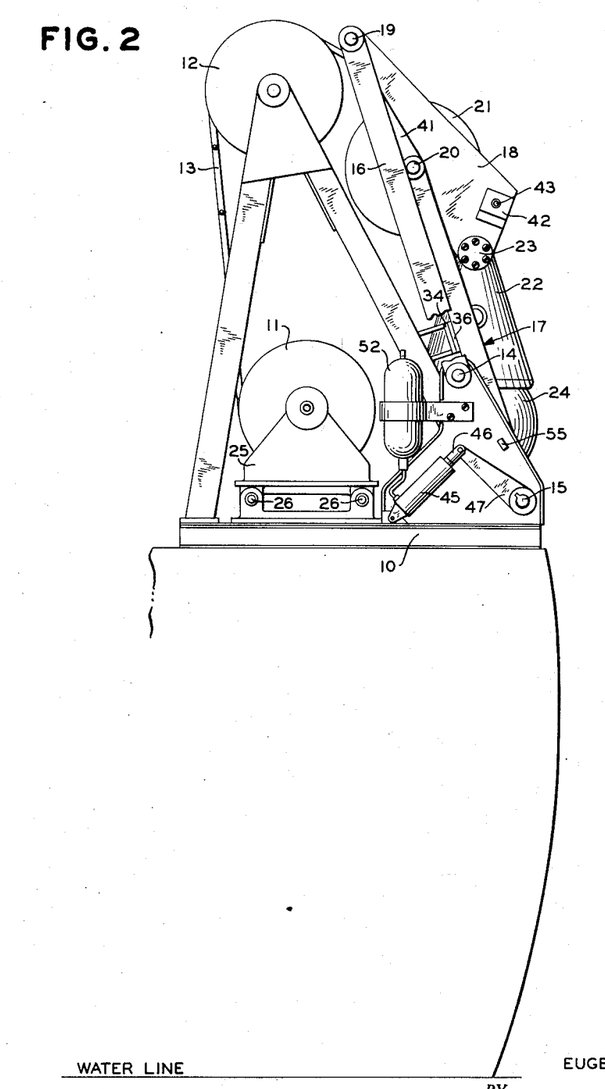
Fig. 2 is a similar view showing the parts swung inboard in stowed relation, a portion of the upper boom broken away to show the lower boom resting against a stop provided therefor.

The machine shown in Figs. 1 and 2 comprises a base 10 suitable for mounting on shipboard, carrying a drum 11 and an upper sheave 12 for the articulated link hoisting chain or cable 13 and carrying the upper and lower pivots 14 and 15 for the inboard ends of the upper and lower booms 16 and 17.

The outboard ends of these booms are shown connected in parallelogram relation by a spacer head 18 pivoted to the upper boom at 19 and to the lower boom at 20.

The sheave 21 for the outboard end of the hoist cable connection is shown journaled on the pivot center 20, directly over the upper, smaller end of the guide cone 22, attached to the lower end of the spacer head 18, at 23.

The towed vehicle is shown in this instance as a sphere 24 attached to the end of the articulated linkage 13.

Figure 7:
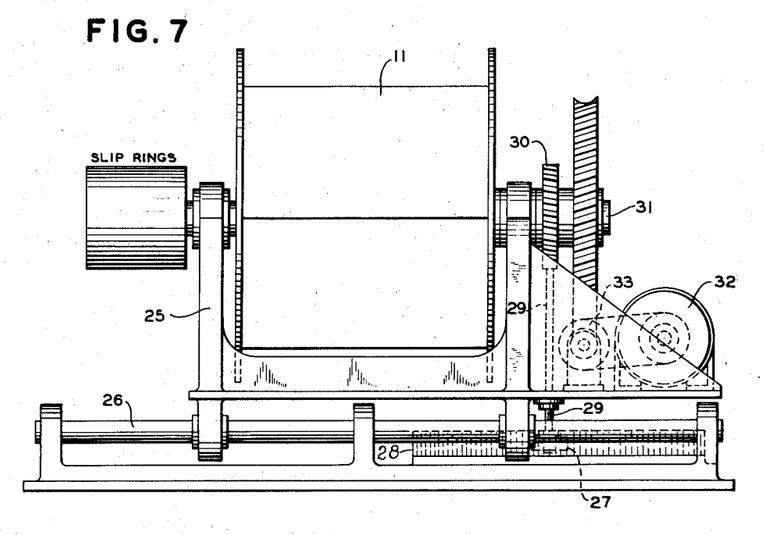
Fig. 7 is a front elevation illustrating mechanism for traversing the drum to keep the pull on the articulated linkage in a straight line.
Figure 8:
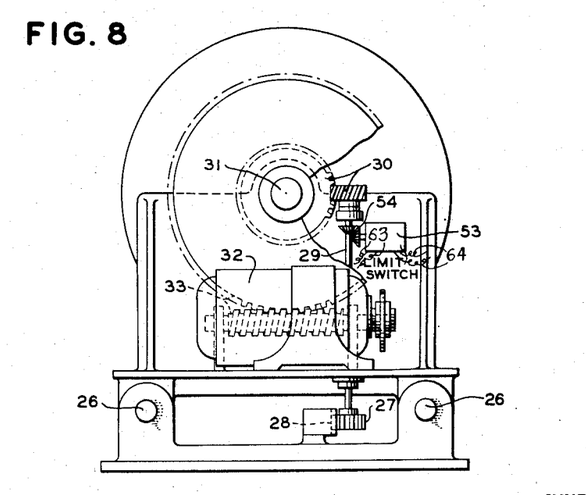
Fig. 8 is an end elevation viewing the right-hand end of the drum shown in Fig. 7.

The hoisting drum 11 and upper and outer sheaves 12 and 21 are shown as hexagonal in shape with sides of a length to suit the length of the links in the articulated chain connection, and the drum is shown as mounted on a carriage 25, Figs. 7 and 8, riding on rails 26 and traversed to maintain a straight line pull by pinion 27 engaging stationary rack 28 and driven by shaft 29 and gearing 30 from the shaft 31 of the drum.

The motor for operating the drum is shown at 32 mounted on the carriage and driving the drum through reduction gearing 33.

The articulated linkage constitutes a hoisting and towing connection flexible to wind on and off the drum and to pass over the sheaves but inflexible as to twist and therefore capable of maintaining the towed vehicle in line with the ship.

The supporting center 14 for the upper boom is shown set above and inside the center 15 for the lower boom so that in traveling to stowing position, Fig. 2, they will swing past an upper dead center and come to rest in an inwardly inclined relation, determined in this particular illustration by engagement of lower boom 17 against a fixed stop 34 on the framework of the base.

Figures 3, 4:
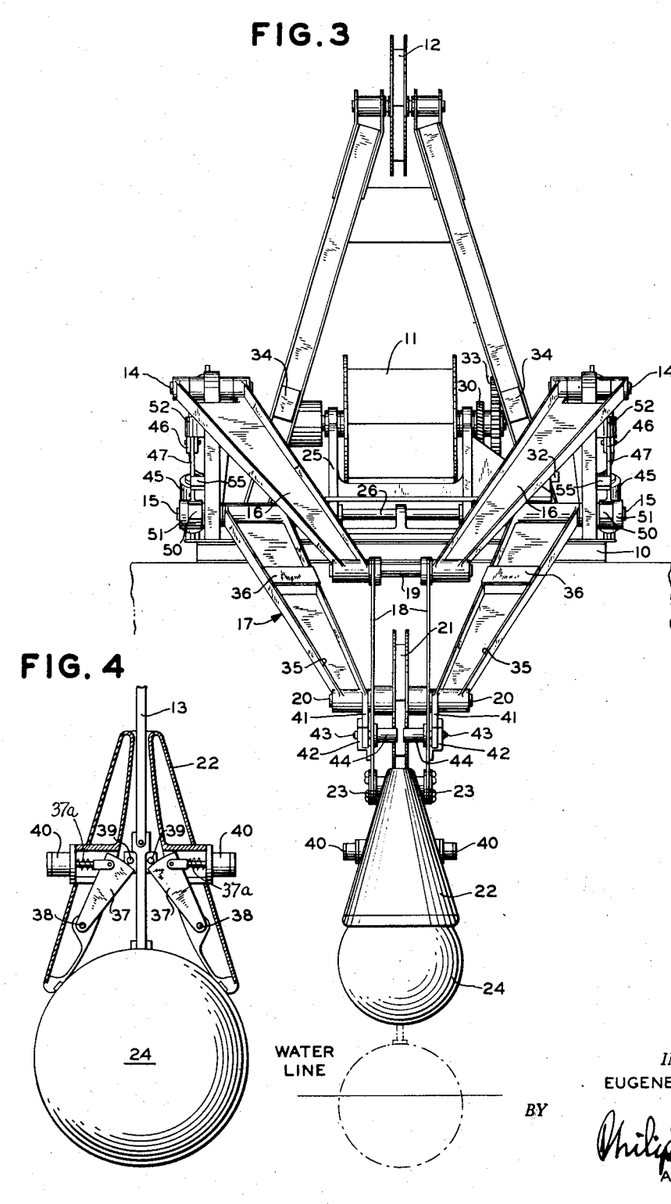
Fig. 3 is an offside view of the hoist in the lowered towing position corresponding to Fig. 1.
Fig. 4 is an enlarged view showing the vehicle, in this case a sphere, raised and locked in the guide cone, portions of the latter sectioned to show the hydraulically actuated securing dogs.

As particularly shown in Fig. 3, the booms may preferably be of V formation, made up in each instance of outwardly convergent side members in the shape of tapering channel struts 35. This construction provides a wide base at the side of the ship and substantial fore-and-aft bracing for the outer ends of the booms.

The pivotal mounting 14 for the upper boom is shown in the form of separated short shafts, whereas the pivotal mounting 15 for the lower boom is indicated as a single longitudinally extending shaft.

The pivots 19 and 20 for the boom spacing head 18 are shown as shafts connecting the convergent outer ends of the companion boom struts 35.

Pads are shown positioned in the channels of the lower boom struts to rest against the backstops 34.

In the hoisting operation the vehicle is automatically locked to the boom head so as to move as a unit therewith under pull of the hoisting connection.

This is accomplished by dogs or catches 37 pivoted in the guide cone at 38, in position to be forced back and then engage beneath abutments 39 on the hoist connection, these catches being thrust into the holding relation shown in Fig. 4 and withdrawn by pistons in the hydraulic cylinders 40.

The booms are shown stopped in outwardly extended, lowered relation by extensions 41 on the ends of the lower boom, engaging in stop brackets 42, Figs. 1 and 2, on the sides of the head 18 and they are locked in this relation while towing, by pins 43 projected through registering openings in the head, extensions and brackets, adapted to be retracted by pistons in hydraulic cylinders 44, Fig. 3, carried by the spacer head 18.

The parts may be so related and arranged that the vehicle 24 will be caught and held to the cone as soon as fully engaged therein, Fig. 4, and the lock pins be released just prior to securing of the vehicle in the cone.

Consequently the vehicle and booms may be lifted with a continuous uninterrupted movement of the single hoist line, the first part of this movement involving hoisting of the vehicle to the boom head and then, after unlocking the booms, the combined raising of booms with the vehicle.

In the latter portion of this movement the parallel connected booms swing the head, guide cone and sphere upwardly and inwardly over the side of the ship, past dead center to the fully stowed, inwardly inclined position shown in Fig. 2.

Figure 5:
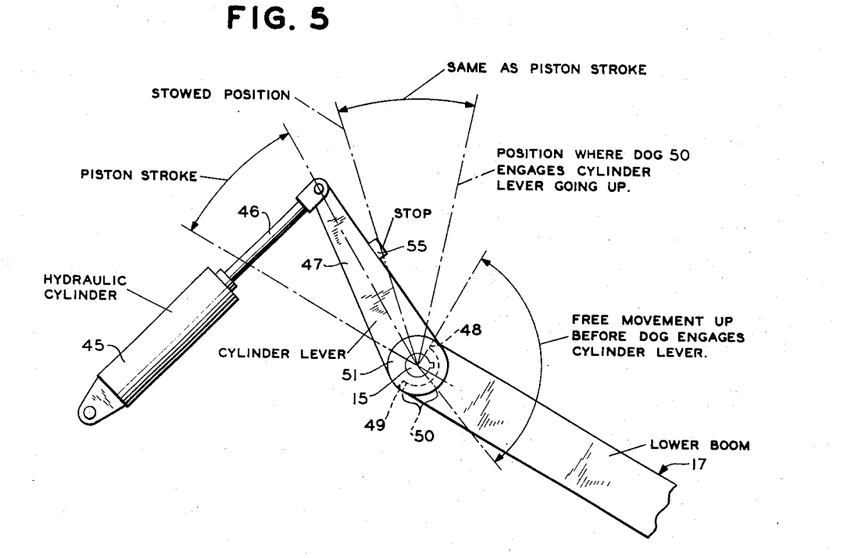
Fig. 5 is a broken diagrammatic view illustration action of the hydraulic buffer cylinders which cushion the stowage movements and start movement past upper dead center in the outward swinging action of the booms.
Figure 6:
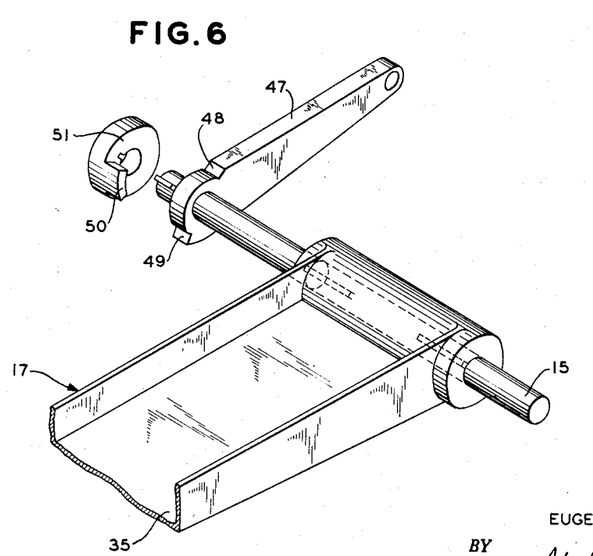
Fig. 6 is a broken separated view of one of the lost motion clutch connections between hydraulic cylinder and shaft forming the lower boom pivot.

Control of the inward swinging movement past upper dead center is effected in the illustration by hydraulic cylinders 45 at opposite ends of the lower boom pivot shaft 15 containing pistons connected by rods 46 with levers 47 pivoted on the shaft and having circumferentially spaced shoulders 48, 49 positioned to be engaged in reverse movements of the shaft by opposite ends of abutment dogs 50 carried by collars 51, Figs. 5 and 6, keyed on the shaft.

These companion stop shoulders on the collars 51 keyed to the boom shaft 15 and the levers 47 loose on the shaft, form lost motion clutches which will engage to cushion upward and inward swinging movement of the booms and by means of stored energy in the cylinders, impart initial outward swinging motion.

For such purposes the cylinders 45 are shown connected with air-oil accumulators 52 which may be of conventional design and which, as levers 47 are forced back by engagement of dogs 50 with the upper shoulders 48, Figs. 2 and 6, will compress air to cushion and stop the inward swinging movement and by this action store energy for starting outward swinging movement.

In the stowed position of parts indicated in Fig. 2, this outward pressure on the booms is desirable to keep the stowed parts firmly tensioned against the pull of the hoist line and hence tight and secure.

After swinging the booms outward past top dead center the action of the cushioning and motion initiating cylinders is stopped, in the illustration, by engagement of the levers 47 with fixed stops 55, Figs. 1 and 5. After such engagement the booms will continue to lower by gravity, as permitted by the hoist line.

Operations may be timed by gears, cams, switches, valves or the like, located in a control box 53, Fig. 8, and driven by gearing 30, 54 from the drum shaft.

*Operation*

Under towing conditions illustrated in Figs. 1 and 3, parallelogram connected booms are extended at the side of the ship and locked down against stops 42 by pins 43, forming a fully braced, rigid support. The articulated link hoist line holds the vehicle against twisting, suspended in line with the side of the vessel.

When the vehicle, the ball 24 in this case, is to be hoisted, the limit switch mechanism at 53, Fig. 8, timed from the drum, effects operation of a hydraulic four-way valve to cause hydraulic cylinders 44 to withdraw lock pins 43 just before the sphere reaches the cone. The drum mechanism continues to haul as the sphere reaches the cone and as this occurs the sphere begins to raise the booms. This feature of using a single hoist line and lifting the booms through the pull on the sphere avoids any need for coordinating forces applied to booms and sphere.

Figure 9:
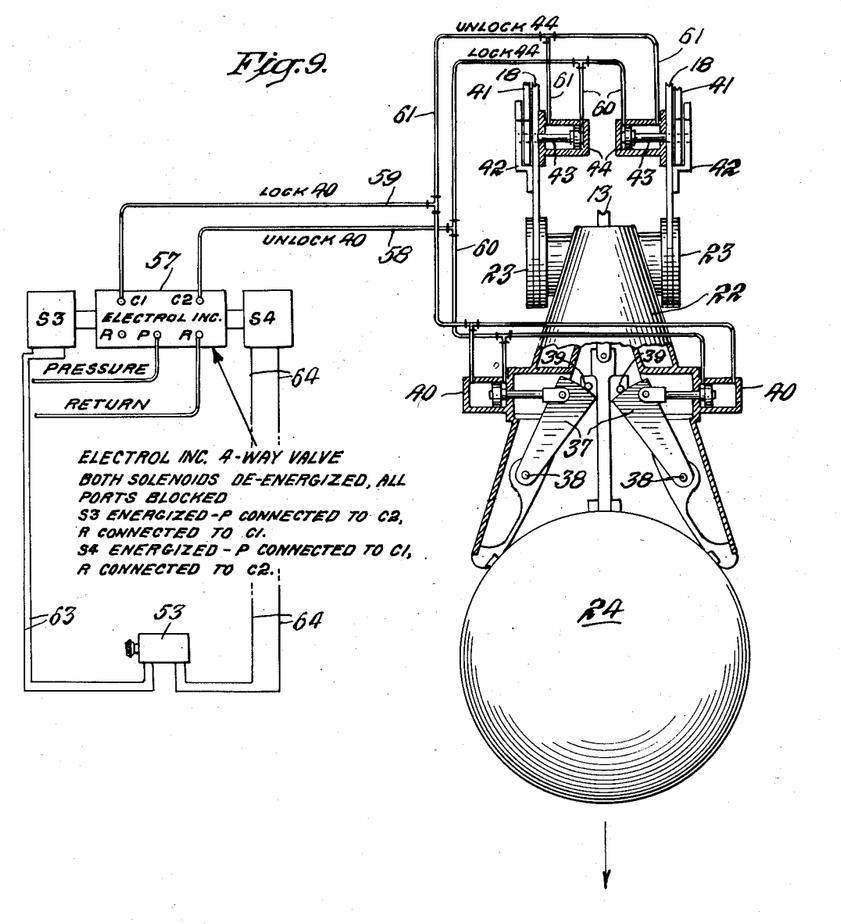
Fig. 9 is a broken sectional and part diagrammatic view illustrating control of the locking dogs and pins for securing the vehicle and booms.

Fig. 9 shows the four way valve 57 operating in opposite directions by solenoids S3 and S4 controlled by limit switches in control box 53 operated from the drum. The electrical connections necessary for effecting such operations are indicated at 63 and 64 in that view. When solenoid S3 is energized the pressure side of the valve at P is connected to that side of the valve at C2 having the unlocking line 58 leading to the unlocking ends of cylinders 40 and the relief port R is connected to the other side of the valve at C1 having the locking line 59 leading to the locking ends of cylinders 40. Branches 60 lead from the unlocking line 58 to the locking ends of cylinders 44 and branches 61 lead from the locking line 59 to the unlocking ends of cylinders 44. Consequently, when the locking dogs 37 are retracted to release the vehicle from the towing eye, the boom locking pins 43 will be projected to lock the booms in extended position.

The reverse action is effected when solenoid S4 is energized to connect the pressure side of the valve at P with the other, lock line side of the valve at C1 and the unlock side of the valve at C2 with the relief or return line 62, to accomplish locking of the vehicle in the towing eye and unlocking of the booms for hoisting to stowed position.

Before the booms reach vertical position the dogs 50 on the lower boom rock shaft 15, by engagement with shoulders 48, Fig. 6, pick up the levers 47 to force back the pistons in hydraulic cylinders 45, Fig. 5, so that as the booms swing inward past the vertical to stowed position shown in Fig. 2, the oil in the cylinders will be forced into accumulators 52 providing the effect of hydraulic springs cushioning and bringing the booms gradually to rest against backstops 34. These backstops and companion stop pads 36 on the lower boom, either or both, may be resilient or spring supported.

In the stowed position, Fig. 2, the booms are far enough inboard to rest solidly against fixed stops 34. Additionally, the hoist drum, by tension on the hoist line, holds the booms firmly against the stops, the hoist motor being automatically stopped by limit switch or other control to effect this result.

In this stowed relation the pistons are forced inward in cylinders 45, as shown in Fig. 2, and these therefore serve as cushions aiding in holding the stowed parts firmly against any lost motion movement.

To lower, the drum motor is operated to unwind the cable and as this occurs, pressure in the accumulators 52 applied through hydraulic cylinders 45, operates levers 47 to rock the lower boom shaft 15 and thus swing the lower boom and connected upper boom outwardly beyond vertical center, this motion initiating pressure being discontinued after the booms pass over dead center by engagement of levers 47 with fixed stops 55, Figs. 1 and 5.

Thereafter the weight of the vehicle locked to the cone lowers the booms by gravity.

As the booms lower to fully extended position, the four way valve 57 actuated from the control box 53 unlocks the vehicle from the cone and locks the booms in extended position as above described.

The hoist drum will then continue to lower the vehicle, possibly until operator presses a stop button or until the drum is stopped automatically when all the articulated strut is payed out, possibly controlled by a limit switch.

The drum is automatically traversed in both hoisting and lowering operations to keep the articulated link hoist line straight and accurately centered on the drum, avoiding any twisting or turning tendencies.

In the stowed position the parts are firmly held against roll or pitch of the ship. In this inboard position all parts are accessible and upon releasing the means for locking the vehicle in the cone, Fig. 4, the vehicle may be lowered on deck.

Constructed as here illustrated, the hoist is a complete self-powered unit applicable as such to ships now in service.

The V-strut formation of the booms has the advantage of providing a wide base mounting and a wide open center to receive the boom head, guide cone and sphere in the inwardly swung, stowed position of the parts.

While the articulated linkage illustrated forms a satisfactory non-turning or non-twisting hoist line or towline for keeping the vehicle lined up with the ship, and particularly in that the links being tubular provide a flexible conduit for multiple conductor cable connecting electronic equipment in the sphere with the ship, it is contemplated that other forms of direction maintaining hoisting and suspension means may be employed, and while only one important use of the invention has been described, it should be realized that the invention has many other possible uses.

The hinged bolts or catches which lock the vehicle in the guide cone or ball are shown in Fig. 4 as making interlocking engagement with opposite sides of the terminal connection with the vehicle, thus to take torque load off the line and maintain the vehicle in position lined up with the ship, ready for instant launching.

The V-strut formation of the booms provides space for reception of the guide and vehicle in the stowed position of parts, and the conical shape of the guide and spherical form of the vehicle enable these parts to enter between the convergent sides of the booms.

What is claimed is:

1. A ship having a hoist for towing vehicles comprising a boom structure incorporating a parallelogram of levers including upper and lower booms pivoted in superposed relation at their inboard ends and pivotally connected at their outer ends by a paralleling boom head, a towed vehicle, a centering guide for said vehicle on said boom head, said guide being in the nature of a hollow cone, an articulated link hoist line connected with said vehicle and extending up through said guide, a guide sheave for said hoist line carried by the lower boom above said guide and a hoist drum for said hoist line.

2. A hoist mounted on a ship for towing a vehicle over the side thereof, comprising a boom structure incorporating a parallelogram of levers including upper and lower booms pivotally supported at their inner ends and pivotally connected in parallel relation at their outer ends, a guide at the outer end of the booms, a towed vehicle, a hoist line connected with said vehicle and extending up through said guide, means included in said hoist line for resisting twist thereof, a drum for winding and unwinding said hoist line to raise and lower said vehicle, said guide being in the nature of a hollow cone and constructed to receive, center and form an abutment for said vehicle and whereby hoisting of the vehicle after engagement with the guide will impart lifting movement to the booms.

3. A hoist mounted on a ship for towing a vehicle over the side thereof, comprising a boom structure incorporating a parallelogram of levers including upper and lower booms pivotally supported at their inner ends and pivotally connected in parallel relation at their outer ends, a guide at the outer end of the booms, a towed vehicle, a hoist line connected with said vehicle and extending up through said guide, means included in said hoist line for resisting twist thereof, a drum for winding and unwinding said hoist line to raise and lower said vehicle, said guide being constructed to receive, center and form an abutment for said vehicle and whereby hoisting of the vehicle after engagement with the guide will impart lifting movement to the booms, means for locking the vehicle engaged in said guide to the guide and means for releasing said locking means to enable lowering of the vehicle with the hoist line from the guide.

4. A hoist mounted on a ship for towing a vehicle over the side thereof, comprising a boom structure incorporating a parallelogram of levers including upper and lower booms pivotally supported at their inner ends and pivotally connected in parallel relation at their outer ends, a guide at the outer end of the booms, a towed vehicle, a hoist line connected with said vehicle and extending up through said guide, means included in said hoist line for resisting twist thereof, a drum for winding and unwinding said hoist line to raise and lower said vehicle, said guide being constructed to receive, center and form an abutment for said vehicle and whereby hoisting of the vehicle after engagement with the guide will impart lifting movement to the booms, means for locking the vehicle engaged in said guide to the guide and means for releasing said locking means to enable lowering of the vehicle with the hoist line from the guide, means for locking the booms in extended relation and means for releasing said boom locking means prior to lifting engagement of the vehicle with said guide.

5. A hoist mounted on a ship for towing a vehicle over the side thereof, comprising a boom structure incorporating a parallelogram of levers including upper and lower booms pivotally supported at their inner ends and pivotally connected in parallel relation at their outer ends, a guide at the outer end of the booms, a towed vehicle, a hoist line connected with said vehicle and extending up through said guide, means included in said hoist line for resisting twist thereof, a drum for winding and unwinding said hoist line to raise and lower said vehicle, said guide being constructed to receive, center and form an abutment for said vehicle and whereby hoisting of the vehicle after engagement with the guide will impart lifting movement to the booms, said booms having inboard freedom of movement past top vertical center and means for cushioning said movement past top center and for applying stored cushioning force to swing the booms outward over top center.

6. A hoist mounted on a ship for towing a vehicle over the side thereof, comprising a boom structure incorporating a parallelogram of levers including upper and lower booms pivotally supported at their inner ends and pivotally connected in parallel relation at their outer ends, a guide at the outer end of the booms, a towed vehicle, a hoist line connected with said vehicle and extending up through said guide, means included in said hoist line for resisting twist thereof, a drum for winding and unwinding said hoist line to raise and lower said vehicle, said guide being constructed to receive, center and form an abutment for said vehicle and whereby hoisting of the vehicle after engagement with the guide will impart lifting movement to the booms, said booms having inboard freedom of movement past top vertical center and means for cushioning said movement past top center and for applying stored cushioning force to swing the booms outward over top center, said cushioning means including hydraulic cylinders, pistons and accumulators, the pistons of said cylinders having lost motion clutch connections with one of the booms.

7. A hoist mounted on a ship for towing a vehicle over the side thereof comprising boom structure including a parallelogram of levers pivotally mounted to swing from an inboard, inwardly inclined stowed relation, upwardly over vertical center and downwardly to an outwardly extending position, stops one for engaging and arresting said boom structure when stowed in said inwardly inclined position and another for engaging and holding said boom structure in said outwardly extended relation, a vehicle to be towed, a guide for said vehicle carried by said boom structure, a guide sheave on the boom structure over said vehicle guide, a hoist drum, a suspension line extending from the drum over said guide sheave and through said vehicle guide to the vehicle, means included in said hoist line for resisting twisting thereof and means for cushioning movement of the boom structure in swinging over top center to the inwardly inclined stowed position and for impulsing the boom structure from the inwardly inclined relation upwardly and downwardly over the vertical center position.

8. A hoist mounted on a ship for towing a vehicle over the side thereof comprising boom structure including a parallelogram of levers pivotally mounted to swing from an inboard inwardly inclined stowed relation, upwardly over vertical center and downwardly to an outwardly extending position, stops one for engaging and arresting said boom structure when stowed in said inwardly inclined position and another for engaging and holding said boom structure in said outwardly extended relation, a vehicle to be towed, a guide for said vehicle carried by said boom structure, a guide sheave on the boom structure over said vehicle guide, a hoist drum, a suspension line extending from the drum over said guide sheave and through said vehicle guide to the vehicle, means included in said hoist line for resisting twisting thereof and means for cushioning movement of the boom structure in swinging over top center to the inwardly inclined stowed position and for impulsing the boom structure from the inwardly inclined position upwardly and downwardly over the vertical center position, said cushing means including hydraulic cylinder, piston and accumulator means, there being lost motion clutch connections between the piston of said cylinder and said boom structure.

9. A hoist mounted on a ship for towing a vehicle over the side thereof comprising boom structure including a parallelogram of levers pivotally mounted to swing from an inboard, inwardly inclined stowed relation, upwardly over vertical center and downwardly to an outwardly extending position, stops one for engaging and arresting said boom structure when stowed in said inwardly inclined position and another for engaging and holding said boom structure in said outwardly extended relation, a vehicle to be towed, a guide for said vehicle carried by said boom structure, a guide sheave on the boom structure over said vehicle guide, a hoist drum, a suspension line extending from the drum over said guide sheave and through said vehicle guide to the vehicle, means included in said hoist line for resisting twisting thereof and means for cushioning movement of the boom structure in swinging over top center to the inwardly inclined stowed position and for impulsing the boom structure from the inwardly inclined relation upwardly and downwardly over the vertical center position, including a pressure accumulator and a lost motion clutch connected therewith, the mounting for the swinging boom structure including a rock shaft and said lost motion clutch being connected with said rock shaft.

10. A hoist mounted on a ship for towing a vehicle over the side thereof comprising boom structure pivotally mounted to swing from an inboard, inwardly inclined stowed relation, upwardly over vertical center and downwardly to an outwardly extending position, stops one for engaging and arresting said boom structure when stowed in said inwardly inclined position and another for engaging and holding said boom structure in said outwardly extended relation, a vehicle to be towed, a guide for said vehicle carried by said boom structure, a guide sheave on the boom structure over said vehicle guide, a hoist drum, a suspension line extending from the drum over said guide sheave and through said vehicle guide to the vehicle, means included in said hoist line for resisting twisting thereof and means for cushioning movement of the boom structure in swinging over top center to the inwardly inclined stowed position and for impulsing the boom structure from the inwardly inclined relation upwardly and downwardly over the vertical center position, including a pressure accumulator and a lost motion clutch connected therewith, the mounting for the swinging boom structure including a rock shaft and said lost motion clutch being connected with said rock shaft, and a stop for limiting the action of said pressure accumulator to the swinging movement of the boom structure over the vertical center position.

11. A hoist mounted on a ship for towing a vehicle over the side thereof comprising boom structure pivotally mounted to swing from an inboard, inwardly inclined stowed relation, upwardly over vertical center and downwardly to an outwardly extending position, stops one for engaging and arresting said boom structure when stowed in said inwardly inclined position and another for engaging and holding said boom structure in said outwardly extended relation, a vehicle to be towed, a guide for said vehicle carried by said boom structure, a guide sheave on the boom structure over said vehicle guide, a hoist drum, a suspension line extending from the drum over said guide sheave and through said vehicle guide to the vehicle, means included in said hoist line for resisting twisting thereof and means for cushioning movement of the boom structure in swinging over top center to the inwardly inclined stowed position and for impulsing the boom structure from the inwardly inclined relation upwardly and downwardly over the vertical center position, a lock for securing the boom structure in the outwardly extended relation and means for releasing said lock prior to engagement of the vehicle with the guide and whereby in continuing hoisting movement the vehicle, through engagement with the guide, will serve to raise the boom structure.

12. A hoist mounted on a ship for towing a vehicle over the side thereof comprising boom structure pivotally mounted to swing from an inboard, inwardly inclined stowed relation, upwardly over vertical center and downwardly to an outwardly extending position, stops one for engaging and arresting said boom structure when stowed in said inwardly inclined position and another for engaging and holding said boom structure in said outwardly extended relation, a vehicle to be towed, a guide for said vehicle carried by said boom structure, a guide sheave on the boom structure over said vehicle guide, a hoist drum, a suspension line extending from the drum over said guide sheave and through said vehicle guide to the vehicle, means included in said hoist line for resisting twisting thereof and means for cushioning movement of the boom structure in swinging over top center to the inwardly inclined stowed position and for impulsing the boom structure from the inwardly inclined relation upwardly and downwardly over the vertical center position, a lock for securing the boom structure in the outwardly extended relation and means for releasing said lock prior to engagement of the vehicle with the guide and whereby in continuing hoisting movement the vehicle, through engagement with the guide, will serve to raise the boom structure, means for locking the vehicle engaged in the guide and means for automatically unlocking and releasing the vehicle from the guide in the lowering movement of the boom structure.

13. A hoist mounted on a ship for towing a vehicle over the side thereof comprising boom structure pivotally mounted to swing from an inboard, inwardly inclined stowed relation, upwardly over vertical center and downwardly to an outwardly extending position, stops one for engaging and arresting said boom structure when stowed in said inwardly inclined position and another for engaging and holding said boom structure in said outwardly extended relation, a vehicle to be towed, a guide for said vehicle carried by said boom structure, a guide sheave on the boom structure over said vehicle guide, a hoist drum, a suspension line extending from the drum over said guide sheave and through said vehicle guide to the vehicle, means included in said hoist line for resisting twisting thereof and means for cushioning movement of the boom structure in swinging over top center to the inwardly inclined stowed position and for impulsing the boom structure from the inwardly inclined relation upwardly and downwardly over the vertical center position, said boom structure comprising upper and lower booms connected by a paralleling head and said guide being carried by said head.

14. A hoist mounted on a ship for towing a vehicle over the side thereof comprising boom structure pivotally mounted to swing from an inboard, inwardly inclined stowed relation, upwardly over vertical center and downwardly to an outwardly extending position, stops one for engaging and arresting said boom structure when stowed in said inwardly inclined position and another for engaging and holding said boom structure in said outwardly extended relation, a vehicle to be towed, a guide for said vehicle carried by said boom structure, a guide sheave on the boom structure over said vehicle guide, a hoist drum, a suspension line extending from the drum over said guide sheave and through said vehicle guide to the vehicle, means included in said hoist line for resisting twisting thereof and means for cushioning movement of the boom structure in swinging over top center to the inwardly inclined stowed position and for impulsing the boom structure from the inwardly inclined relation upwardly and downwardly over the vertical center position, said boom structure comprising upper and lower booms connected by a paralleling head and said guide being carried by said head, said booms being in the form of V-struts pivoted at their open base ends and with the boom head, guide and vehicle received within the open centers of the V-struts in the inwardly inclined, stowed relation of the boom structure.

15. A hoist mounted on a ship for towing a vehicle over the side thereof, comprising a V-strut boom structure incorporating four load-bearing booms all pivotally mounted at the open base end of the V structure, a sheave at the apex of the V structure, a guide below the sheave, a vehicle engageable in said guide, a hoist line extending over the sheave through the guide to said vehicle, means for hauling said line to raise the vehicle into the guide and to cause the vehicle when engaged with the guide, to raise the boom, said guide and vehicle being receivable in the open base portion of the V-strut formation in the raised position of the boom.

16. A hoist mounted on a ship for towing a vehicle over the side thereof, comprising a V-strut boom structure incorporating four load-bearing booms all pivotally mounted at the open base end of the V structure, a sheave at the apex of the V structure, a guide below the sheave, a vehicle engageable in said guide, a hoist line extending over the sheave through the guide to said vehicle, means for hauling said line to raise the vehicle into the guide and to cause the vehicle when engaged with the guide, to raise the boom, said guide and vehicle being receivable in the open base portion of the V-strut formation in the raised position of the boom, means for locking the boom in lowered position and means for automatically releasing said locking means in the hoisting movement of the vehicle prior to engagement of the vehicle with said guide.

17. A hoist mounted on a ship for towing a vehicle off the side thereof, comprising upper and lower V-struts pivotally mounted at their open ends, a head pivotally connecting the outer ends of the struts in spaced relation, each of the two arms of the V of each of said V-struts being a load-bearing boom, a sheave journaled in said head, a dependent guide cone carried by said head, a towed vehicle engageable in said guide cone, a hoist line extending over the sheave through said guide cone to said vehicle, a locking pin for connecting the head and one of said struts in the lowered position of the struts and means for automatically releasing said locking pin prior to engagement of the vehicle in said guide cone in the hoisting movement of the vehicle.

18. A hoist mounted on a ship for towing a vehicle off the side thereof, comprising upper and lower V-struts pivotally mounted at their open ends, a head pivotally connecting the outer ends of the struts in spaced relation, a sheave journaled in said head, a dependent guide cone carried by said head, a towed vehicle engageable in said guide cone, a hoist line extending over the sheave through said guide cone to said vehicle, a locking pin for connecting the head and one of said struts in the lowered position of the struts and means for automatically releasing said locking pin prior to engagement of the vehicle in said guide cone in the hoisting movement of the vehicle, means for locking the vehicle in the cone and means for releasing said last mentioned vehicle locking means in the lowering movement of the V-struts.

19. A hoist mounted on a ship for towing a vehicle off the side thereof, comprising boom structure mounted to swing over the side of a ship, an outboard sheave carried by said boom structure, an inboard sheave, a hoist drum, a towed vehicle, a hoist line extending from said drum over the inboard and outboard sheaves to said vehicle and means for traversing said drum in respect to the inboard sheave to maintain straight line pull on said hoist line, said hoist line being made up of articulated links and said drum and sheaves having angularly related sides approximating the length of the links in said hoist line.

20. A hoist mounted on a ship for towing a vehicle over the side thereof, comprising upper and lower booms pivotally supported at their inner ends and pivotally connected in parallel relation at their outer ends, a guide at the outer end of the booms, a towed vehicle, a hoist line connected with said vehicle and extending up through said guide, a drum for winding and unwinding said hoist line to raise and lower said vehicle, said guide being in the nature of a hollow cone and constructed to receive, center and form an abutment for said vehicle whereby hoisting of said vehicle after engagement with the guide will impart lifting movement to the booms.

21. A hoist mounted on a ship for towing a vehicle over the side thereof, comprising boom structure pivotally mounted to swing from an inboard, inwardly inclined stowed relation, upwardly over vertical center and downwardly to an outwardly extending position, stops one for engaging and arresting said boom structure when stowed in said inwardly inclined position and another for engaging and holding said boom structure in said outwardly extended relation, a vehicle to be towed, a guide for said vehicle carried by said boom structure, a guide sheave on the boom structure over said vehicle guide, a hoist drum, a suspension line extending from the drum over said guide sheave and through said vehicle guide to the vehicle, and means for cushioning movement of the boom structure in swinging over top center to the inwardly inclined stowed position and for impulsing the boom structure from the inwardly inclined relation upwardly and downwardly over the vertical center position.

References Cited in the file of this patent

UNITED STATES PATENTS

| Number | Name | Date |
| --- | --- | --- |
| 376,417 | Rogers | Jan. 10, 1888 |
| 531,117 | Harman et al. | Dec. 18, 1894 |
| 1,197,394 | Philippi | Sept. 5, 1916 |
| 1,292,255 | Cherry | Jan. 1, 1919 |
| 1,893,157 | Burrill et al. | Jan. 3, 1933 |
| 2,261,483 | Nickles | Nov. 4, 1941 |
| 2,601,927 | Frenzel | July 1, 1952 |
| 2,616,102 | Webster | Nov. 4, 1952 |
| 2,660,319 | Dorland | Nov. 24, 1953 |
| 2,667,649 | Elling | Feb. 2, 1954 |
| 2,712,878 | Sutton et al. | July 12, 1955 |